(12) United States Patent
Cazier et al.

(10) Patent No.: US 7,545,996 B2
(45) Date of Patent: Jun. 9, 2009

(54) METHOD AND APPARATUS FOR THE CREATION OF IMAGE POST-PROCESSING PARAMETER CURVES

(75) Inventors: Robert P. Cazier, Fort Collins, CO (US); Murray D. Craig, Johnstown, CO (US); Benjamin D. Kimbell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 888 days.

(21) Appl. No.: 11/119,016

(22) Filed: Apr. 29, 2005

(65) Prior Publication Data

US 2006/0245668 A1    Nov. 2, 2006

(51) Int. Cl.
*G06K 9/36* (2006.01)
*G06K 9/40* (2006.01)

(52) U.S. Cl. .................................. 382/276; 382/254
(58) Field of Classification Search .................. 382/254, 382/255, 274, 275, 167, 276, 190; 348/135, 348/180, 188
See application file for complete search history.

(56) References Cited

U.S. PATENT DOCUMENTS

| | | | |
|---|---|---|---|
| 5,815,645 A | 9/1998 | Fredlund | |
| 6,011,536 A | 1/2000 | Hertzmann | |
| 6,101,293 A | 8/2000 | McKenzie | |
| 6,154,577 A | 11/2000 | Warnick | |
| 6,285,468 B1 | 9/2001 | Cok | |
| 6,317,192 B1 | 11/2001 | Silverbrook | |
| 6,507,667 B1 * | 1/2003 | Hsieh et al. | 382/167 |
| 6,671,387 B1 | 12/2003 | Chen | |
| 6,724,913 B1 | 4/2004 | Chen | |
| 6,775,407 B1 | 8/2004 | Gindele | |
| 6,795,585 B1 | 9/2004 | Parada | |
| 7,277,198 B2 * | 10/2007 | Kawanabe et al. | 358/1.9 |
| 2004/0258308 A1 | 12/2004 | Sadovsky | |
| 2004/0263640 A1 | 12/2004 | Silverbrook | |
| 2005/0104970 A1 * | 5/2005 | Shiraki et al. | 348/208.99 |

* cited by examiner

*Primary Examiner*—Yon Couso

(57) ABSTRACT

A user provides a graphical representation of a desired image post-processing parameter curve. A first digital image of the graphical representation of a desired image post-processing parameter curve is captured. The first digital image is analyzed by an image processor that generates necessary post-processing parameters as defined by the desired image post-processing parameter curve. The image processor uses the resulting post-processing parameters to modify a second digital image.

20 Claims, 6 Drawing Sheets

METHOD AND APPARATUS FOR THE CREATION OF IMAGE POST-PROCESSING PARAMETER CURVES

CROSS-REFERENCE TO RELATED APPLICATION

This application is related to application Ser. No. 11/119,191 entitled, "Method and Apparatus for the Creation of Image Capture Device Parameter Curves," filed on or about the same date as the present application, and hereby incorporated herein by reference. Application Ser. No. 11/119,191 discloses and claims a method for the automatic generation of image post-processing parameter curves.

FIELD OF THE INVENTION

The present invention relates generally to the field of image post-processing, and more particularly to the field of accurate and easy curve generation for image post-processing.

BACKGROUND OF THE INVENTION

Post-processing of digital images through the use of computers provides a user the capability to creatively modify the digital images in a very wide variety of ways. However, many of the software post-processing tools require the user to overcome a steep learning curve, and to spend large amounts of time in a trial and error method to achieve the desired results. Also, many computers are limited by the ability to input complex data such as the parameter curves used to perform many of the post-processing modifications such as vignetting (the fade to black often seen around the edges of photographs, see FIG. 1 for an exaggerated example of vignetting) or color table modification. This problem is especially acute in the case of post-processing done within a digital camera.

Digital cameras typically lack the keyboard and mouse of a computer, and in many cases limit the user to several buttons for control of the digital camera. It is extremely difficult for users to create or modify post-processing parameter curves using only a plurality of buttons for control. Simplistic post-processing methods may include a default curve or use a linear modification of the post-processing parameter instead of a complex curve. This may simplify operation, but may also fail to provide the user with the desired post-processing effect. Users may be able to quickly draw by hand an approximation of the desired parameter curve, but without an easy way to transfer this shape to the image post-processor, the user is required to spend time replicating the desired curve within the post-processing software.

SUMMARY OF THE INVENTION

A user provides a graphical representation of a desired image post-processing parameter curve. A first digital image of the graphical representation of a desired image post-processing parameter curve is captured. The first digital image is analyzed by an image processor that generates necessary post-processing parameters as defined by the desired image post-processing parameter curve. The image processor uses the resulting post-processing parameters to modify a second digital image.

Other aspects and advantages of the present invention will become apparent from the following detailed description, taken in conjunction with the accompanying drawings, illustrating by way of example the principles of the invention.

DETAILED DESCRIPTION

Figure 1:
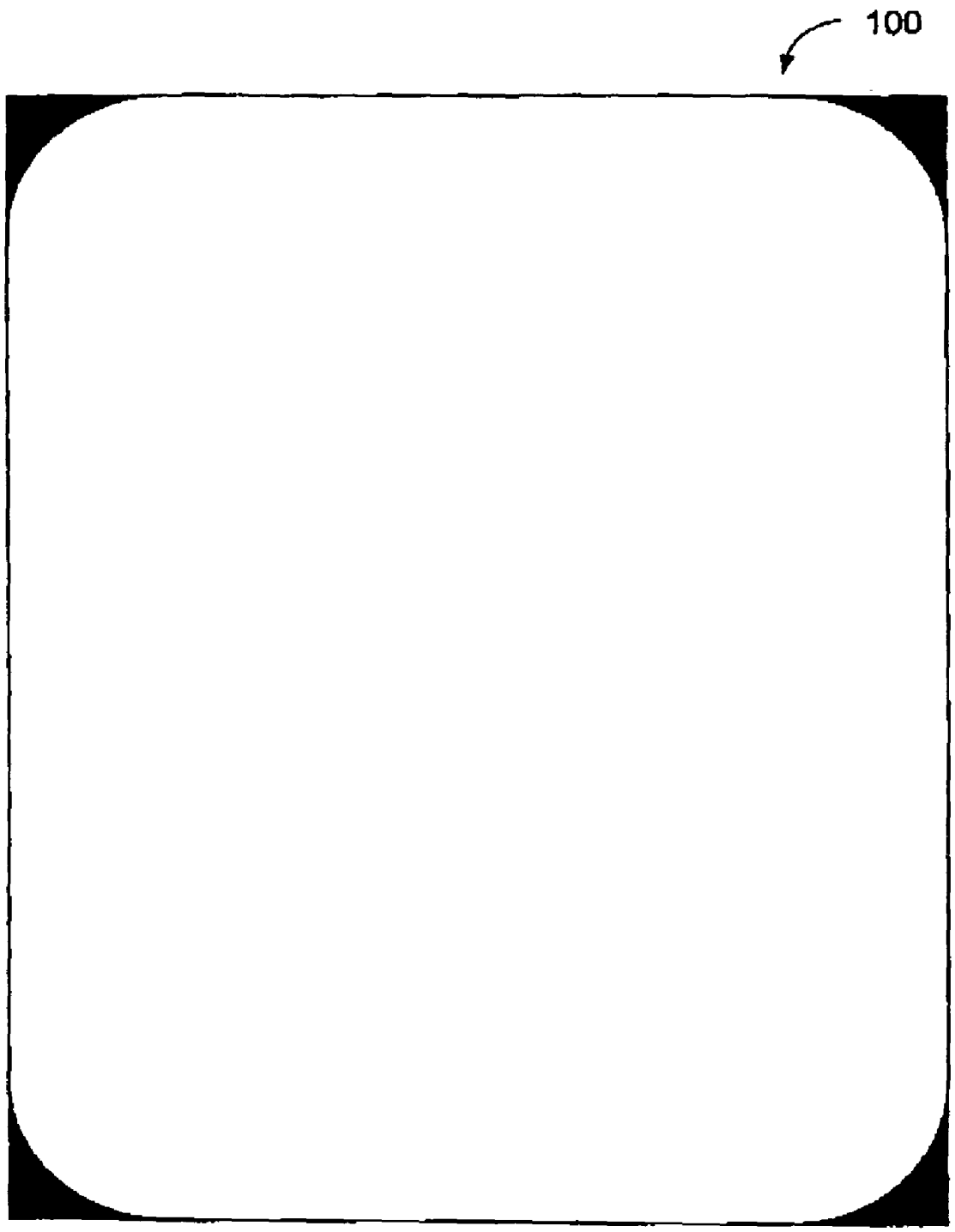
FIG. 1 is an example of a first image including vignetting.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

The word "curve" as used in this description of the present invention includes any single parameter function. For example, in some embodiments of the present invention, the "curve" may be a straight line. In other embodiments of the present invention, the "curve" may not be contiguous, but include sudden step functions. Those of skill in the art will recognize that any function where each possible value of a first parameter results in a single value of a second parameter may be described as a "curve" within the scope of the present invention.

FIG. 1 is an example of a first image including vignetting. This figure is a greatly exaggerated example of an image 100 including vignetting. Notice that the image 100 fades to black at all four edges. Such vignetting in cameras may be caused by limitations of the camera lens' ability to cover the entire film (or image capture) surface resulting in a fade to black at the edges and particularly in the corners. Older cameras and lenses are more likely to have this limitation, thus some users may wish to re-create this effect with modern digital cameras to give an image an antique feel.

Figure 2:
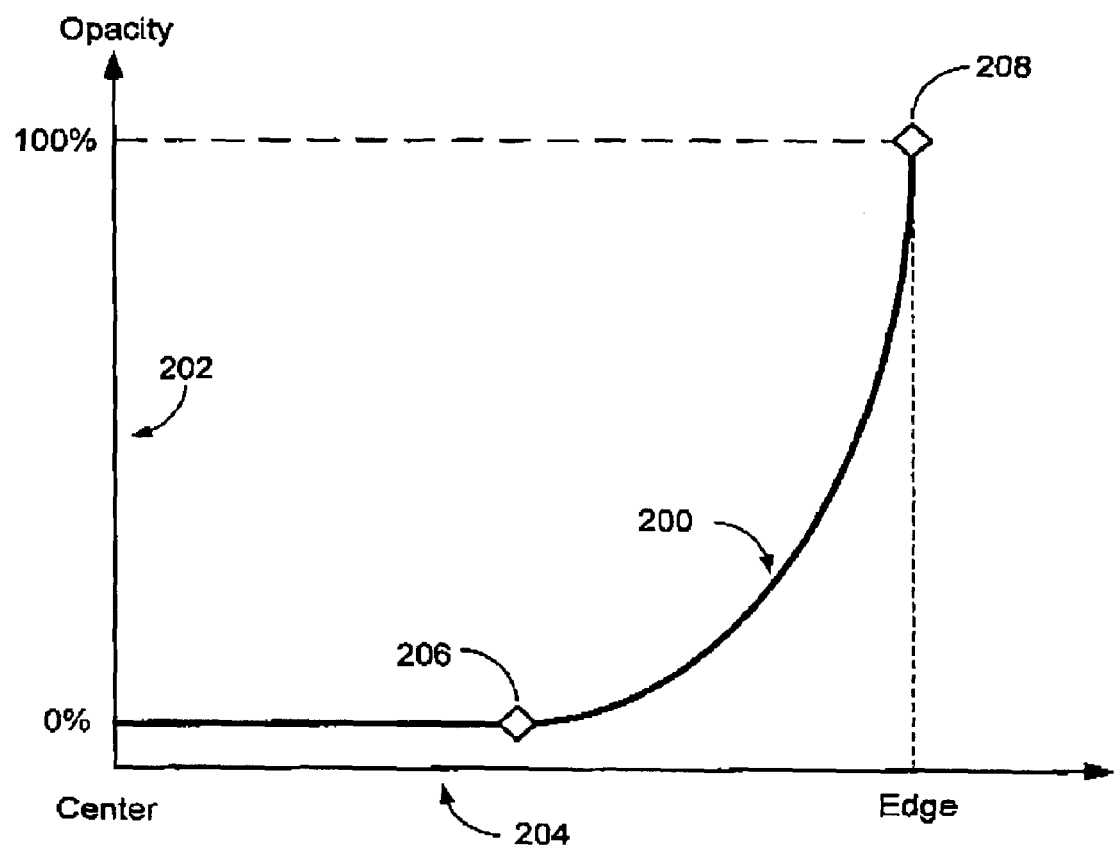
FIG. 2 is an example of a desired opacity curve used to create vignetting according to an example embodiment to the present invention.

FIG. 2 is an example opacity curve used to create vignetting according to an example embodiment to the present invention. In this example post-processing parameter curve 200, the x-axis 204, represents position within the image to be modified, and the y-axis 202, represents the corresponding opacity desired to be applied to the image at any given position within the image. Note that in this example embodiment opacity is at 0% from the center of the image out to a point 206 where the opacity starts to climb until reaching 100% opacity at a point 208 at the outside edge of the image. Post processors will generate a function relating position within the image to opacity and apply this function to each point within a desired image. This function is defined by one or more image post-processing function parameters. In some cases this function may be linear, in others exponential, and in still others there may be a linear region leading into an exponential region such as in the example opacity curve of FIG. 2. Those of skill in the art will recognize that each value of x translates to a single value of y when this parameter function is applied.

As used within this description, "image post-processing function parameters" are those mathematical parameters used to describe the function generated from the desired image post-processing parameter curve. For example a linear "curve" may be represented by a function of the form $y=f(x)=mx+b$, where m is the slope of the line and b is the point where the line crosses the y-axis. Thus, parameters m and b are the "image post-processing function parameters" for this particular "curve." Those of skill in the art will recognize that many more complex functions with their corresponding "image post-processing function parameters" may be used within the scope of the present invention.

Those of skill in the art will recognize that while this example embodiment of the present invention concerns vignetting, or a fade to black post-processing parameter, many other post-processing parameter curves may be captured using the method of the present invention. For example, curves related to color falloff, blurring, image distortion, noise generation, gradiated filters, and many other image post-processing parameters may be captured using the method of the present invention.

Those of skill in the art will also recognize that this example curve is applied from the center of the image, to all edges of the image, while other example embodiments of the present invention may include parameter curves that may be applied in a wide variety of ways taking into account any desired symmetry. For example, parameter curves may be applied from the top of the image to the bottom of the image, or from the left side of the image to the right side of the image, or from the center to a single edge. Such variations in the extent of the x-axis generally correlate to the specific post-processing parameter being modified. For example, gradiated filters typically use a single curve from top to bottom or left to right of the image. When the user selects to capture a gradiated filter parameter curve, the image capture device may ask the user to select between a variety of possible x-axis representations. The quantity and specific parameters of the variety of possible x-axis representations will vary with the parameters chosen for modification.

Figure 3:
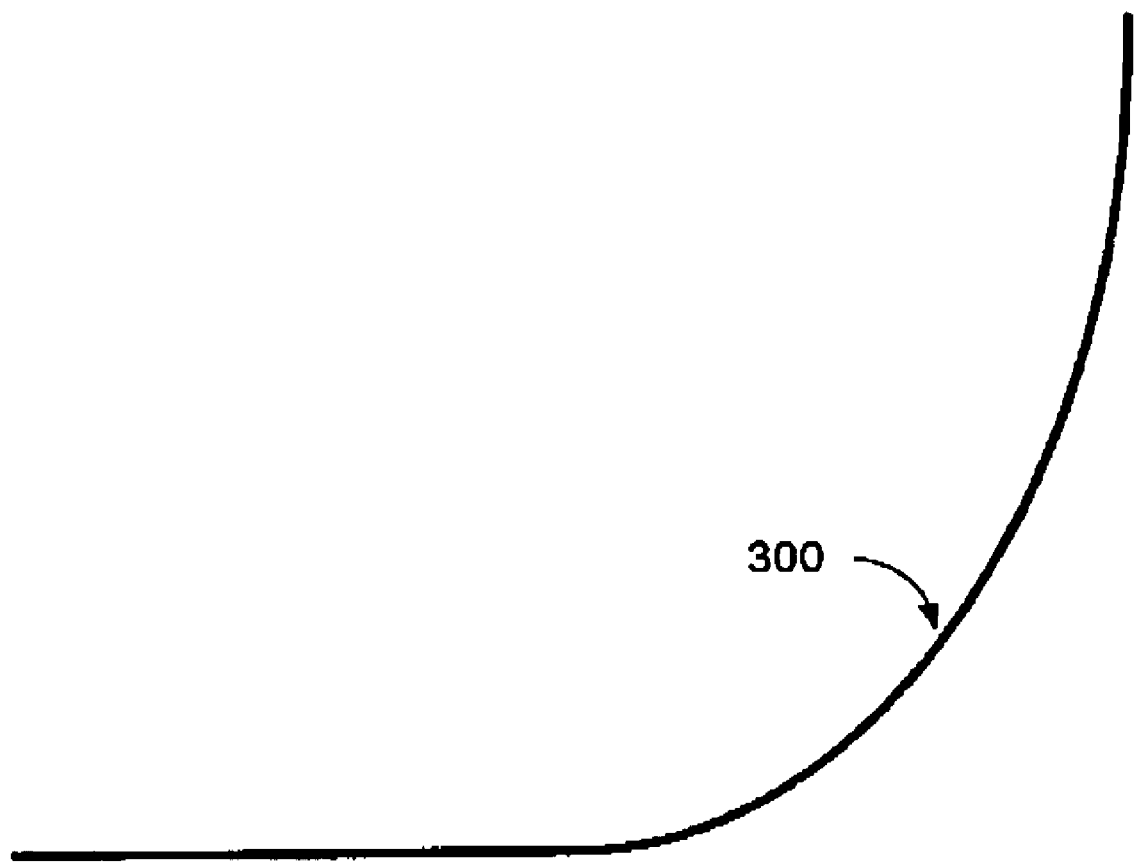
FIG. 3 is an example of how a user may draw the desired opacity curve of FIG. 2.

FIG. 3 is an example of how a user may draw the desired opacity curve of FIG. 2. In this case the user has drawn a simple curve 300 representing the desired fade to black image post-processing parameter. Notice that the user did not provide any axis for the curve.

Figure 4A:
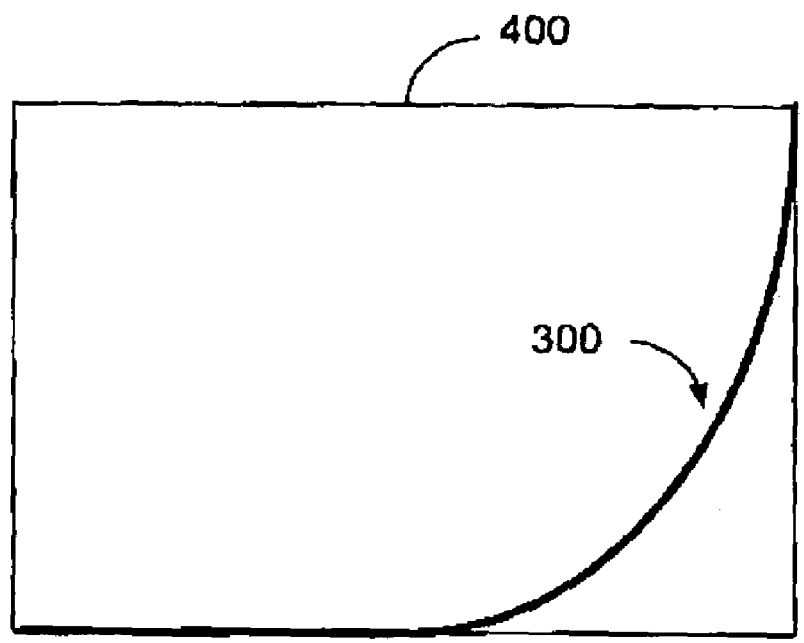
FIG. 4A is a representation of the view through the optical viewfinder or of a viewfinder display of an image capture device configured to capture the user drawn opacity curve of FIG. 3 according to an example embodiment of the present invention.

FIG. 4A is a representation of the view through the optical viewfinder or of a viewfinder display of an image capture device configured to capture the user drawn opacity curve of FIG. 3 according to an example embodiment of the present invention. In this example embodiment of the present invention, the entire optical viewfinder or viewfinder display 400 is used to delineate the bounds of the desired image post-processing curve. The bottom edge of the optical viewfinder or viewfinder display 400 acts as the x-axis and minimum y value. The left edge of the optical viewfinder or viewfinder display 400 acts as the y-axis and minimum x value. The upper edge of the optical viewfinder or viewfinder display 400 acts as the maximum y value. The right edge of the optical viewfinder or viewfinder display 400 acts as the maximum x value.

Those of skill in the art will recognize that while some image capture devices include optical viewfinders, other image capture devices may use, for example, an LCD display in place of an optical viewfinder or in addition to an optical viewfinder, and that either or both may be used within the scope of the present invention.

Figure 4B:
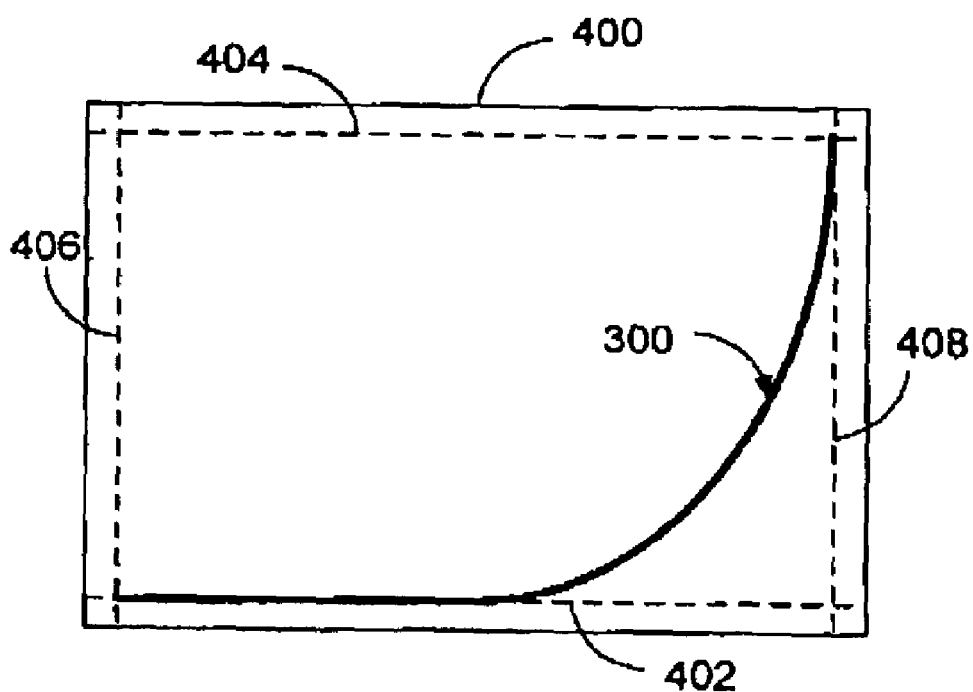
FIG. 4B is another representation of the view through the optical viewfinder or of a viewfinder display of an image capture device configured to capture the user drawn opacity curve of FIG. 3 according to an example embodiment of the present invention.

FIG. 4B is another representation of the view through the optical viewfinder or of a viewfinder display of an image capture device configured to capture the user drawn opacity curve of FIG. 3 according to an example embodiment of the present invention. In this example embodiment of the present invention visual elements are shown within the optical viewfinder or viewfinder display 400 which delineate the bounds used in capturing the desired image post-processing parameter curve. Less than all of the optical viewfinder or viewfinder display 400 is used to capture the desired image post-processing parameter curve. In this example embodiment of the present invention, dashed lines are used as the visual elements delineating the bounds of the image post-processing curve. However, those of skill in the art will recognize that a wide variety of other visual elements may be used to delineate the bounds of the image post-processing parameter curve within the scope of the present invention. In this example embodiment of the present invention, a lower dashed line 402 is used to represent the x-axis and minimum y value of the image post-processing parameter curve, and an upper dashed line 404 is used to delineate the maximum y value. A left dashed line 406 is used to represent the y-axis and minimum x value of the image post-processing parameter curve, and a right dashed line 408 is used to delineate the maximum x value.

Those of skill in the art will recognize that once users have captured a first digital image of a particular desired image post-processing parameter curve, these first digital images may be stored for later use with on a variety of second digital images. Thus, the user need capture a parameter curve only once, and may use that parameter curve later on a wide variety of second digital images. Also, users may build up a library of first digital images of parameter curves for later use, or for sharing with others.

Figure 5:
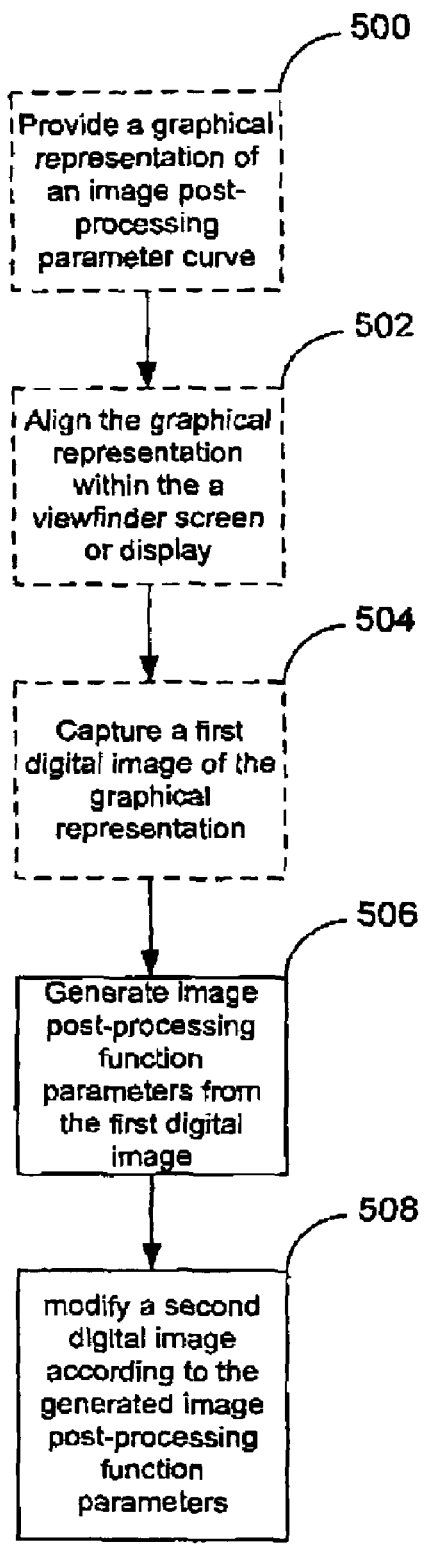
FIG. 5 is a flow chart of a method of generating image post-processing parameters according an example embodiment to the present invention.

FIG. 5 is a flow chart of a method of generating image post-processing parameters according an example embodiment to the present invention. In an optional step 500, a graphical representation of an image post-processing parameter curve is provided. In an optional step 502, the graphical representation is aligned within a viewfinder screen or display. In an optional step 504, a first digital image is captured of the graphical representation of an image post-processing parameter curve. In a step 506, the first digital image is used to generate image post-processing function parameters. In a step 508, the image post-processing function parameters are used to modify a second digital image. Those of skill in the art will recognize that a wide variety of methods may be used to generate image post-processing function parameters from the first digital image within the scope of the present invention. For example, an example embodiment of the present invention may first apply a color threshold to the first digital image, trace the curve from left to right, analyze any gaps to make a smooth single curve, quantize and subsample the curve to create a curve applicable to the entire image, duplicate the curve as necessary to apply symmetry, all before generating the function parameters for the application of the post-processing parameter.

Figure 6A:
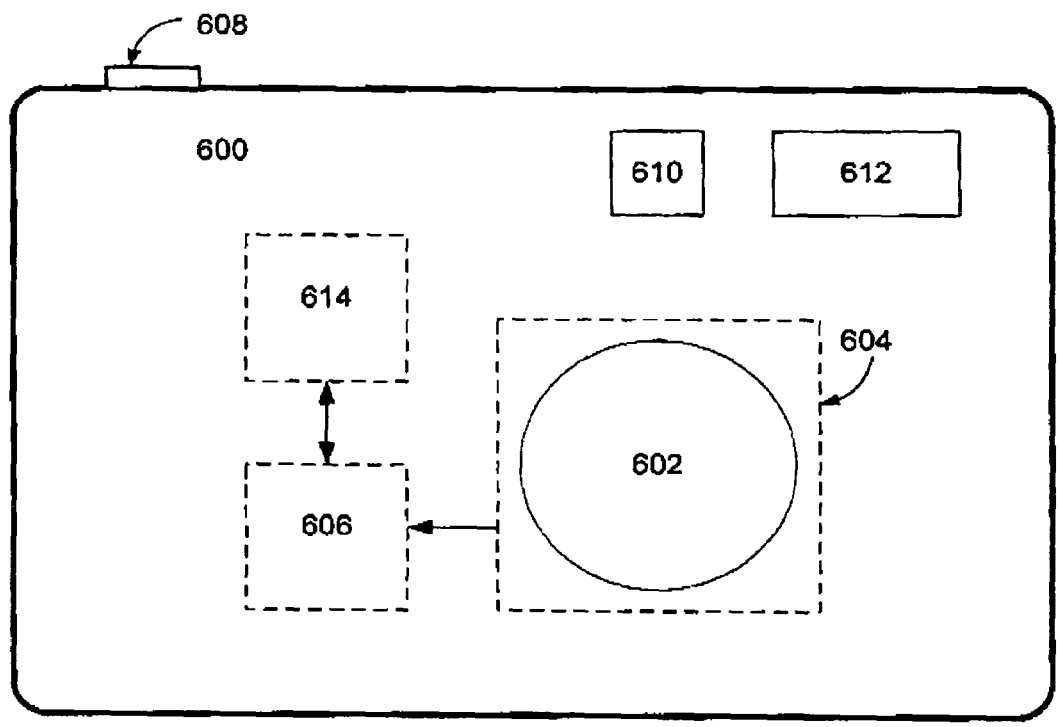
FIG. 6A is a front view of an example embodiment of a device for generating image post-processing function parameters according to the present invention.

FIG. 6A is a front view of an example embodiment of a device for generating image post-processing function parameters according to the present invention. In this example embodiment of the present invention, a digital camera 600, including a lens 602, an image sensor 604, such as a CCD or CMOS sensor, a memory 606, a shutter button 608, an optical viewfinder 610, and a strobe 612, is configured to generate image post-processing function parameters. This digital camera 600 also includes a processor 614, electrically coupled with the memory 606, configured to generate image post-processing function parameters from a first digital image of an image post-processing parameter curve, and to apply the image post-processing function parameters to a second digital image. Those of skill in the art will recognize that a digital camera 600 is but one of a variety of devices that may be configured to generate image post-processing function parameters from a first digital image of an image post-processing parameter curve, and to apply the image post-processing function parameters to a second digital image, within the scope of the present invention. For example, a computer may be used as an embodiment of the present invention where the first digital image, and second digital image are captured by a separate image capture device and provided to the computer processor for generation and application of the image post-processing function parameters.

Figure 6B:
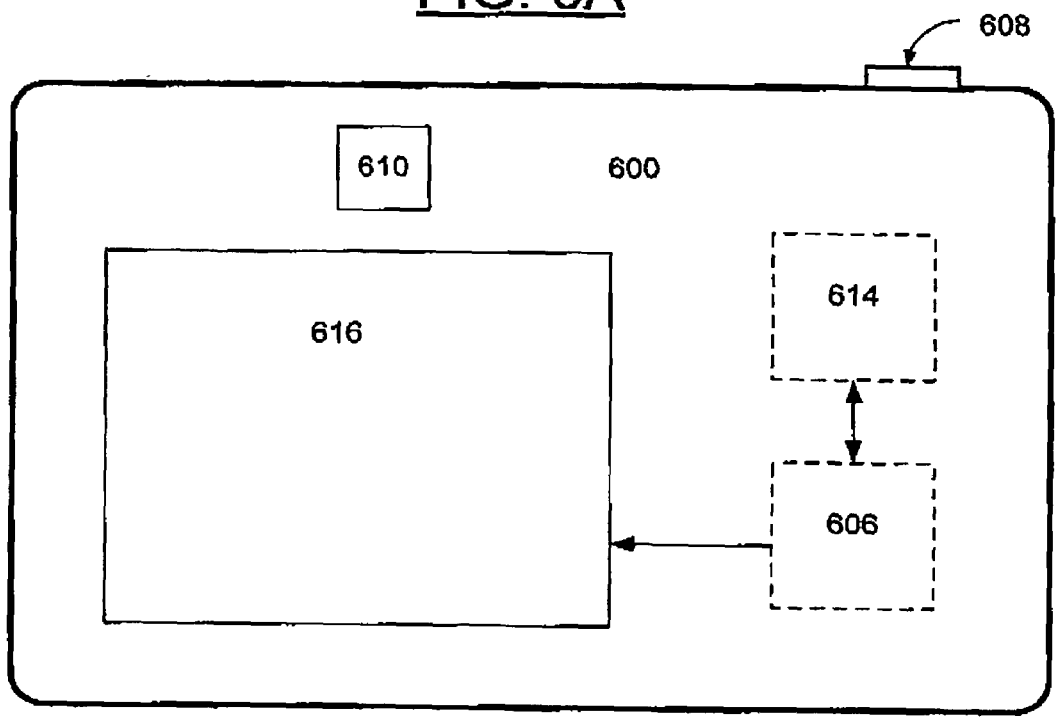
FIG. 6B is a rear view of an example embodiment of a device for generating image post-processing function parameters according to the present invention.

FIG. 6B is a rear view of an example embodiment of a device for generating image post-processing function parameters according to the present invention. In this example embodiment of the present invention, the digital camera 600, also includes a viewfinder display 616, such as an LCD display used to show viewfinder images and other information such as user interface menus for control of the digital camera 600.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method as comprising the steps of: a) providing, by an image processor, a graphical representation of an image post-processing parameter curve; b) capturing a first digital image of the provided image port-processing parameter curve; c) generating, by the image processor, image post-processing function parameters from the first digital image; d) modifying, by the image processor, a second digital image according to the generated image port-processing function parameters and e) aligning the graphical representation of an image post-processing parameter curve within an optical viewfinder before capturing the first digital image.

2. A method as recited in claim 1, wherein the entirety of the optical viewfinder is configured to delineate bounds of the image post-processing parameter curve.

3. A method as recited in claim 1, wherein less than all of the optical viewfinder is configured to delineate bounds of the image post-processing parameter curve.

4. A method as recited in claim 3, wherein said optical viewfinder is configured to display visual elements delineating the bounds of the image post-processing parameter curve.

5. A method comprising the steps of: a) providing, by an image processor, a graphical representation of an image post-processing parameter curve; b) capturing a first digital image of the provided image port-processing parameter curve; c) generating, by the image processor, image post-processing function parameters from the first digital image; d) modifying, by the image processor, a second digital image according to the generated image port-processing function parameters and e) aligning the graphical representation of an image post-processing parameter curve on a viewfinder display before capturing the first digital image.

6. A method as recited in claim 5, wherein the entirety of the viewfinder display is configured to delineate bounds of the image post-processing parameter curve.

7. A method as recited in claim 5, wherein less than all of the viewfinder display is configured to delineate bounds of the image post-processing parameter curve.

8. A method as recited in claim 7, wherein said viewfinder display is configured to display visual elements delineating the bounds of the image post-processing parameter curve.

9. A device comprising: a memory containing a first digital image of a graphical representation of an image post-processing parameter curve, and a second digital image; a processor electrically coupled with said memory, configured to generate image post-processing function parameters from the first digital image, and modify the second digital image according to the generated image post-processing function parameters, an image sensor, electrically coupled with said memory; a lens configured to project an image on said image sensor; and an optical viewfinder; configured to display an image similar to that projected on said image sensor.

10. The device recited in claim 9, wherein said device is configured to capture a first digital image of a graphical representation of an image post-processing parameter curve and store the first digital image in said memory.

11. The device recited in claim 10, wherein, said optical viewfinder is configured to allow a user to align the graphical representation of an image post-processing parameter curve within said optical viewfinder before capturing the first digital image.

12. The device recited in claim 11, wherein the entirety of said optical viewfinder is configured to delineate bounds of the image post-processing parameter curve.

13. The device recited in claim 11, wherein less than all of said optical viewfinder is configured to delineate bounds of the image post-processing parameter curve.

14. The device recited in claim 13, wherein said optical viewfinder is configured to display visual elements delineating the bounds of the image post-processing parameter curve.

15. A device comprising: a memory containing a first digital image of a graphical representation of an image post-processing parameter curve, and a second digital image; a processor electrically coupled with said memory, configured to generate image post-processing function parameters from the first digital image, and modify the second digital image according to the generated image post-processing function parameters, an image sensor, electrically coupled with said memory; a lens configured to project an image on said image sensor; and a viewfinder display; configured to display an image similar to that projected on said image sensor.

16. The device recited in claim 15, wherein said device is configured to capture a first digital image of a graphical representation of an image post-processing parameter curve and store the first digital image in said memory.

17. The device recited in claim 16, wherein, said viewfinder display is configured to allow a user to align the graphical representation of an image post-processing parameter curve within said viewfinder display before capturing the first digital image.

18. The device recited in claim 17, wherein the entirety of said viewfinder display is configured to delineate bounds of the image post-processing parameter curve.

19. The device recited in claim 17, wherein less than all of said viewfinder display is configured to delineate bounds of the image post-processing parameter curve.

20. The device recited in claim 19, wherein said viewfinder display is configured to display visual elements delineating the bounds of the image post-processing parameter curve.

* * * * *

UNITED STATES PATENT AND TRADEMARK OFFICE
CERTIFICATE OF CORRECTION

| | | |
|---|---|---|
| PATENT NO. | : 7,545,996 B2 | Page 1 of 1 |
| APPLICATION NO. | : 11/119016 | |
| DATED | : June 9, 2009 | |
| INVENTOR(S) | : Robert P. Cazier et al. | |

It is certified that error appears in the above-identified patent and that said Letters Patent is hereby corrected as shown below:

In column 5, line 57, in Claim 1, after "method" delete "as".

Signed and Sealed this

Twenty-seventh Day of October, 2009

David J. Kappos
*Director of the United States Patent and Trademark Office*